US010468909B2

(12) United States Patent
Navarro et al.

(10) Patent No.: US 10,468,909 B2
(45) Date of Patent: Nov. 5, 2019

(54) DATA CENTER POWER SYSTEMS WITH DYNAMIC SOURCE DESIGNATION

(71) Applicant: Eaton Intelligent Power Limited, Dublin (IE)

(72) Inventors: George Arthur Navarro, Raleigh, NC (US); Vincent Edward Wilder, Clayton, NC (US)

(73) Assignee: Eaton Intelligent Power Limited (IE)

( * ) Notice: Subject to any disclaimer, the term of this patent is extended or adjusted under 35 U.S.C. 154(b) by 218 days.

(21) Appl. No.: 14/968,944

(22) Filed: Dec. 15, 2015

(65) Prior Publication Data

US 2017/0170683 A1    Jun. 15, 2017

(51) Int. Cl.
*H02J 9/06* (2006.01)
*G06F 1/26* (2006.01)
*H02M 3/04* (2006.01)
*H02M 7/44* (2006.01)

(52) U.S. Cl.
CPC ............... *H02J 9/06* (2013.01); *G06F 1/263* (2013.01); *H02J 9/061* (2013.01); *H02J 9/062* (2013.01); *H02M 3/04* (2013.01); *H02M 7/44* (2013.01); *H02J 2009/068* (2013.01)

(58) Field of Classification Search
CPC ....... G06F 1/263; H02J 2009/068; H02J 9/06; H02J 9/062; H02J 9/061; H02M 3/04; H02M 7/44
See application file for complete search history.

(56) References Cited

U.S. PATENT DOCUMENTS

| 6,268,665 | B1 * | 7/2001 | Bobry ..................... G01R 31/42 307/66 |
| 6,825,578 | B2 * | 11/2004 | Perttu ....................... H02J 9/06 307/70 |
| 7,142,950 | B2 * | 11/2006 | Rasmussen ............... H02J 9/06 700/286 |

(Continued)

FOREIGN PATENT DOCUMENTS

WO    WO 2010/038152    4/2010
WO    WO 2015/177729    11/2015

OTHER PUBLICATIONS

International Search Report and Written Opinion, corresponding Application No. PCT/US2016/066569; dated Mar. 13, 2017, (16 pages).

*Primary Examiner* — Pinping Sun
(74) *Attorney, Agent, or Firm* — Stanek Lemon Crouse & Meeks, P.A.

(57) ABSTRACT

A data center power distribution system includes at least one switch configured to couple at least one first power source to a load and at least one converter configured to couple at least one second power source to the load. The system further includes a control circuit configured to implement a state machine that controls the at least one switch and the at least one converter to redundantly provide power to the load using variable source designations for the at least one first power source and the at least one second power source. Variation of the source designations for the at least one first power source and the at least one second power source may vary a priority relationship among the at least one first power source and the at least one second power source responsive to a control input.

13 Claims, 7 Drawing Sheets

(56) References Cited

U.S. PATENT DOCUMENTS

| | | | | |
|---|---|---|---|---|
| 7,386,743 B2* | 6/2008 | Bahali | G06F 1/3203 | 700/295 |
| 7,446,437 B2* | 11/2008 | Paik | H02J 9/06 | 307/115 |
| 7,560,831 B2 | 7/2009 | Whitted et al. | | |
| 7,969,756 B1* | 6/2011 | Wu | G06F 17/5036 | 323/283 |
| 8,294,297 B2 | 10/2012 | Linkhart et al. | | |
| 8,338,988 B2* | 12/2012 | Togare | G06F 1/263 | 307/85 |
| 8,723,362 B2 | 5/2014 | Park et al. | | |
| 8,731,729 B2* | 5/2014 | Blevins | H02J 3/005 | 700/291 |
| 2005/0239518 A1* | 10/2005 | D'Agostino | G06F 1/3203 | 455/574 |
| 2006/0226706 A1* | 10/2006 | Edelen | H02J 9/06 | 307/64 |
| 2009/0115252 A1* | 5/2009 | Caraghiorghiopol | H02J 1/10 | 307/48 |
| 2010/0164280 A1* | 7/2010 | Togare | G06F 1/26 | 307/17 |
| 2011/0278931 A1* | 11/2011 | Johnson, Jr. | H02J 3/26 | 307/66 |
| 2011/0278932 A1* | 11/2011 | Navarro | H02J 9/062 | 307/66 |
| 2012/0036379 A1* | 2/2012 | Sultenfuss | G06F 1/3203 | 713/320 |
| 2012/0068541 A1* | 3/2012 | Anderson | H02J 9/061 | 307/66 |
| 2012/0074786 A1* | 3/2012 | Johnson, Jr. | H02J 9/062 | 307/66 |
| 2012/0245794 A1* | 9/2012 | Aragai | H02J 1/14 | 701/36 |
| 2013/0007473 A1* | 1/2013 | van der Lee | G06F 1/3212 | 713/300 |
| 2013/0175868 A1* | 7/2013 | Taurand | H02J 1/00 | 307/80 |
| 2013/0257159 A1* | 10/2013 | Wang | H02J 9/06 | 307/65 |
| 2013/0328395 A1 | 12/2013 | Krizman et al. | | |
| 2014/0097680 A1* | 4/2014 | Navarro | H02J 9/06 | 307/23 |
| 2014/0097690 A1* | 4/2014 | Costa | H02J 9/00 | 307/64 |
| 2014/0309802 A1 | 10/2014 | Monahan | | |
| 2015/0008744 A1 | 1/2015 | Navarro | | |
| 2015/0008745 A1* | 1/2015 | Navarro | H02J 9/06 | 307/64 |
| 2015/0326012 A1* | 11/2015 | Tsuchiya | H02J 7/35 | 307/20 |
| 2015/0340864 A1* | 11/2015 | Compton | H02J 3/005 | 307/66 |
| 2016/0013654 A1* | 1/2016 | Saha | H02J 1/14 | 307/29 |
| 2016/0134109 A1* | 5/2016 | Kogo | H02J 3/46 | 307/24 |
| 2016/0181861 A1* | 6/2016 | Familiant | H02J 9/06 | 307/66 |

* cited by examiner

DATA CENTER POWER SYSTEMS WITH DYNAMIC SOURCE DESIGNATION

BACKGROUND

The inventive subject matter relates to power systems and, more particularly, to data center power systems.

Data centers typically utilize redundant power systems. Commonly, one or more uninterruptible power supplies (UPSs) may be used to provide power from a primary utility source, with redundant (i.e., backup, auxiliary) power being provided by the UPS from a secondary source, such as a battery. An automatic transfer switch (ATS) may be used to switch between the primary utility source and a local diesel-powered motor/generator set. Responsive to a failure of a primary utility source, equipment in the data center may be temporarily powered by the UPS from the battery until the utility source is restored. In the event that the outage of the utility source is extended, the local generator may be started and the ATS may transfer the load to the generator until the utility service is restored. Some data centers also utilize additional sources, such as flywheels, photovoltaic panels, and fuel cells.

SUMMARY

Some embodiments of the inventive subject matter provide a data center power distribution system including at least one switch configured to couple at least one first power source to a load and at least one converter configured to couple at least one second power source to the load. The system further includes a control circuit configured to implement a state machine that controls the at least one switch and the at least one converter to redundantly provide power to the load using variable source designations for the at least one first power source and the at least one second power source.

Variation of the source designations for the at least one first power source and the at least one second power source may vary a priority relationship among the at least one first power source and the at least one second power source. For example, the state machine may define transitions between at least one primary power source and at least one secondary power source configured to provide power to the load responsive to a failure of the primary power source and the control circuit may be configured to vary designations of the at least one first power source and the at least one second power source as primary and secondary power sources responsive to a control input. The at least one secondary power source may include a plurality of secondary sources and the control circuit may be configured to vary priorities among the plurality of secondary sources responsive to the control input.

In some embodiments, the at least one first source may include at least one AC source and the at least one second source may include at least one DC source. The at least one switch may include at least one static switch and the at least one converter may include at least one AC/DC converter. In further embodiments, the at least one first source may include at least one DC source and the at least one second source may include at least one AC source.

Additional embodiments provide an uninterruptible power supply (UPS) including first and second static switches configured to couple respective first and second AC power sources to a load, a DC/DC converter having a first port configured to be coupled to a DC power source and an inverter having a first port coupled to a second port of the DC/DC converter and a second port configured to be coupled to a load. The first and second static switches, the DC/DC converter and the inverter may be integrated in a single assembly. The UPS further includes a control circuit configured to implement a state machine that controls the first and second static switches, the DC/DC converter and the inverter to redundantly provide power to the load using variable source designations for the first and second AC power sources and the DC power source.

Methods according to some embodiments include providing data center power distribution system including at least one switch configured to couple at least one first power source to a load and at least one converter configured to couple at least one second power source to the load, operating a state machine that controls the at least one switch and the at least one converter to redundantly provide power to the load using source designations for the at least one first power source and the at least one second power source, and varying the source designations responsive to a control input. Variation of the source designations for the at least one first power source and the at least one second power source may vary a priority relationship among the at least one first power source and the at least one second power source.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes,"

"comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 1:
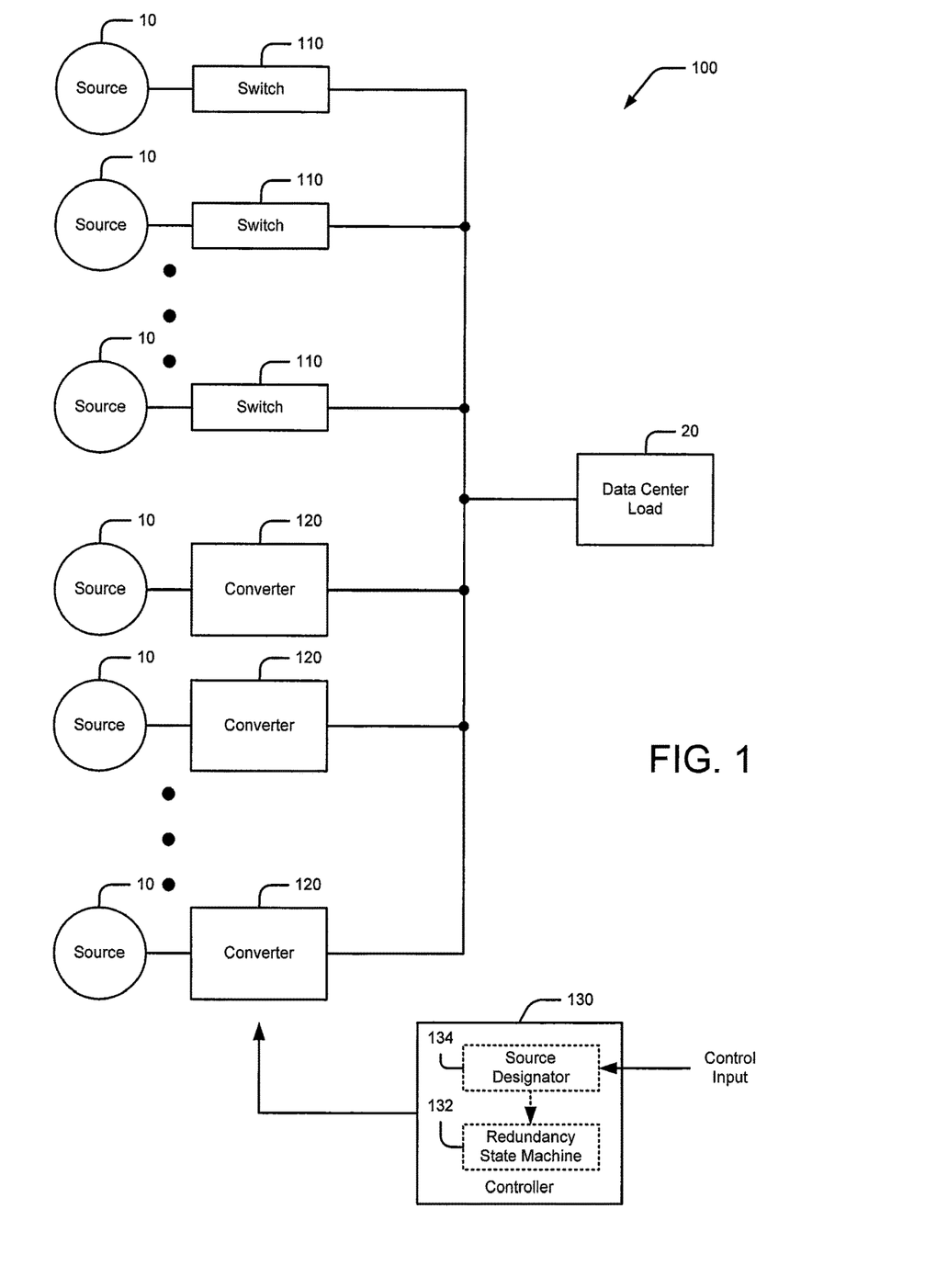
FIG. 1 is a schematic diagram illustrating a system according to some embodiments.

FIG. 1 illustrates a data center power system 100 according to some embodiments of the inventive subject matter. The system 100 includes one or more switches 110 configured to couple respective sources 10 to a load 20. One or more converters 120 are configured to couple respective sources 10 to the load 20. The one or more switches 110 and the one or more converters 120 are controlled by a controller 130, which is configured to implement a redundancy state machine 132 that controls the one or more switches 110 and the one or more converters 120 to redundantly provide power to the load 20 based on source designations that define a priority relationship among the sources 10. The controller 130 is further configured to implement a source designator 134 that changes designations of the various sources responsive to a control input to vary the priority relationship implemented by the redundancy state machine 132, such that the manner in which power is redundantly provided from the sources 10 may be changed while using a common state machine. The control input may include any of a variety of different types of information, for example, measures of availability of the sources 10, a schedule (e.g., data, time of day, etc.) and/or a cost associated with using the various ones of the sources 10.

Some embodiments of the inventive subject matter may change the conventional paradigm under which power is redundantly provided in a data center. In particular, a conventional data center typically operates under fixed prioritization established by the conventions of UPS operation, e.g., primary power is typically provided by a utility grid, with backup power being provided by a local source, such as a battery or a local diesel motor-generator set. In contrast, the illustrated embodiment may provide UPS-like functionality while enabling dynamic redefinition of the priority of various sources without changing the basic redundancy control architecture. Thus, for example, a source, such as a fuel cell or photovoltaic array, may be used as a "secondary" source according to one source designation. To provide different prioritization of the source, its designation may be changed to a "primary" source, and source previous designated as a primary source, such as utility grid, may be designated as a "secondary source" such that, when the fuel cell malfunctions or is otherwise unavailable, the utility grid may be used to provide backup power. The designation of entities as primary and secondary may be varied based on one or more control inputs, such as availability measures for the various sources, weather conditions, cost, and combinations thereof. Using dynamic source designation according to some embodiments enables the use of equipment having a standardized redundancy arrangement that may be easily adapted for different applications, thus providing potential advantages over traditional fixed UPS arrangements.

Figure 2:
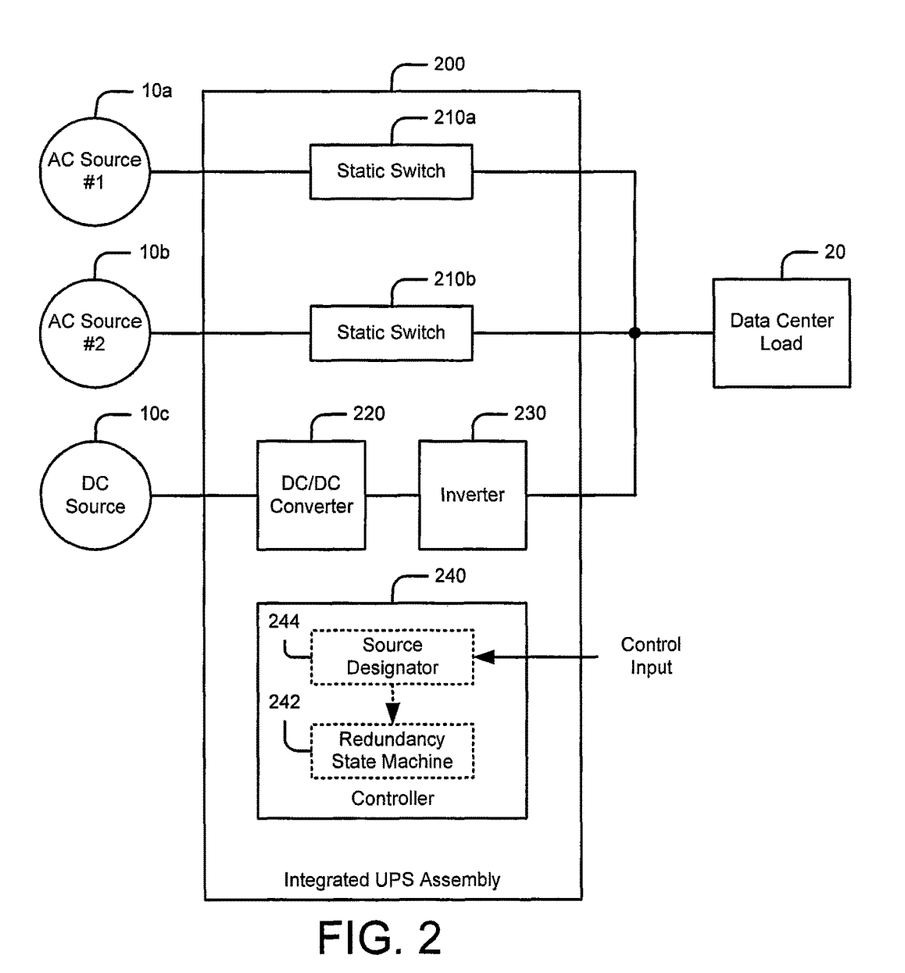
FIG. 2 is a schematic diagram illustrating a data center power system implemented as an integrated UPS assembly according to some embodiments.

FIG. 2 illustrates a system implementing such features according to further embodiments. The system takes the form of an integrated UPS system 200 including first and second static switches 210a, 210b (e.g., bidirectional SCR-based switching units), respective ones of which are configured to couple respective AC sources 10a, 10b to a load 20. The UPS system 200 further includes a DC/AC converter including a DC/DC converter 220 having a first port configured to be coupled to a DC source 10c and an inverter 230 having a first port coupled to a second port of the DC/DC converter 220 and a second port configured to be coupled to the load 20. The DC/DC converter 220 and the inverter 230 may be implemented, for example, using any of a number of different switch mode converter circuits.

A controller 240 controls the static switches 210a, 210b, the DC/DC converter 220 and the inverter 230. The controller 240 is configured to implement a redundancy state machine 242 that operates the static switches 210a, 210b, the DC/DC converter 220 and the inverter 230 to provide power redundancy for the load 20 according to a priority established among the sources 10a, 10b, 10c. The controller 240 also implements a source designator 244 that varies the designation of the sources 10a, 10b, 10c used by the redundancy state machine 242, such that priority relationships among the sources 10a, 10b, 10c may be changed.

Figure 3:
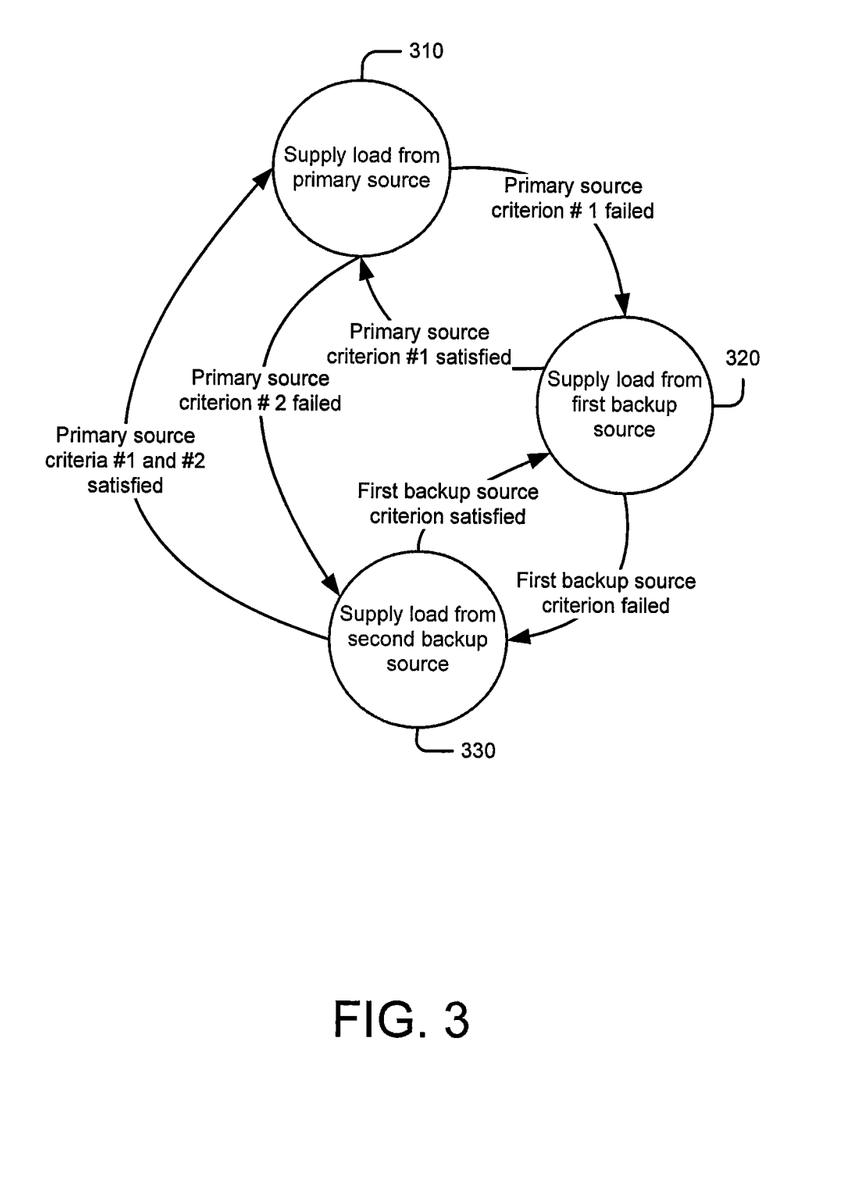
FIG. 3 is a state diagram illustrating operations of a data center power system according to further embodiments.

FIG. 3 illustrates an example of state transitions that may be provided by the redundancy state machine 242. In a first state 310, the load 20 is powered by the designated primary source. When the primary source fails to meet a first predetermined criterion, the state machine 242 transitions the system to a second state 320 in which a first designated backup system powers the load 10. If the primary source subsequently satisfies the first criterion, the state machine 242 takes the system back to the first state 310 in which the primary source again powers the load 20. If, while in the second state 320, the first backup source fails to meet a predetermined criterion, the state machine 242 transitions to a third state 330 in which a second backup source is used to power the load. From this third state 330, the system can transition back to either the first state 310 or the second state 320, depending on the status of the primary source and the first backup source. It will be appreciated that the operations illustrated in FIG. 3 are provided for purposes of illustrations, and may differ in various embodiments of the inventive subject matter.

An example of dynamic redundancy that may be provided by the system 200 of FIG. 2 is illustrated by Table 1:

TABLE 1

| Designations | Conf. #1 | Conf. #2 | Conf. #3 | Conf. #4 |
|---|---|---|---|---|
| Primary | AC Source #1 | DC Source | AC Source #2 | AC Source #2 |
| Backup #1 | DC Source | AC Source #1 | DC Source | AC Source #1 |
| Backup #2 | AC Source #2 | AC Source #2 | AC Source #1 | DC Source |

In the various configurations 1-4, the first backup source (Backup #1) may be the secondary source that is first connected to the load when the primary source fails, and the second backup source (Backup #2) may be the secondary source that is connected to the load when the first backup source fails. It will be appreciated that "failure" of a source generally means the source failing to satisfy one or more predetermined criteria, and may include, for example, reduction in voltage, frequency deviation, excessive noise content, insufficient remaining capacity (e.g., charge, fuel, etc.), and the like.

As explained above, the controller 240 may transition among these different source designations responsive to one or more control inputs. The control inputs may include any of a number of different types of information, such as information about the relative costs of using the various sources and the relative availability of the various sources. Other inputs for controlling the source priority may include other parameters, for example, the criticality of the load being served. For example, while a certain prioritization of sources may provide an optimal cost of operation, such a prioritization may not be acceptable for a certain criticality of the load and/or for a certain availability of the sources, thus motivating a transition to a prioritization that provides a higher degree of security. However, if the availability and/or criticality changes, the system may transition to a prioritization that offers a better cost performance.

The integrated UPS system 200 may be implemented in a number of different ways. For example, the switches 210a, 210b, the DC/DC converter 220, the inverter 230 and the controller 240 may be contained within a single housing designed, for example, to be installed in a data center electrical room. The switches 210a, 210b, the DC/DC converter 220, the inverter 230 and/or the controller may be implemented as modules that are configured to be installed in a frame or other structure, such that numbers and/or capacities of the modules may be varied to suit particular applications. The controller 240 may be implemented as a single centralized controller and/or may be distributed among other modules, such as the switches 210a, 210b, the DC/DC converter 220 and the inverter 230. It will be understood that, generally, these components may be implemented using various arrangements of analog and digital circuitry, including microprocessors, microcontrollers or other data processing devices.

Figure 4:
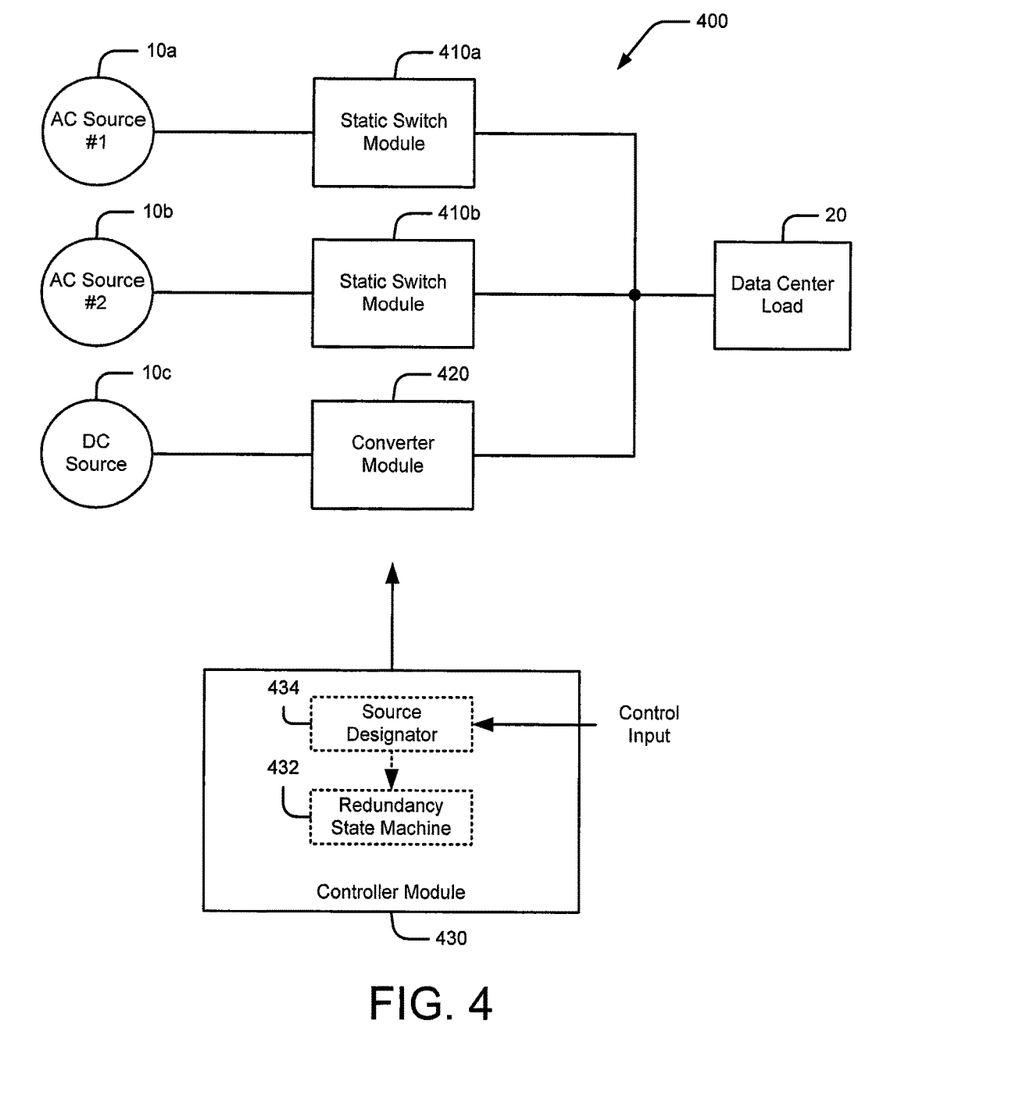
FIG. 4 is a schematic diagram illustrating an illustrating a data center power system implemented using modules according to some embodiments.

According to further embodiments, a system functionally similar to the one illustrated in FIG. 2 may be implemented in non-integrated, modular fashion. Referring to FIG. 4, a system 400 may include first and second static switch modules 410a, 410b (e.g., bidirectional SCR-based switching units), respective ones of which are configured to couple respective AC sources 10a, 10b to a load 20. The UPS system 400 further includes a DC/AC converter module 420 having a first port configured to be coupled to a DC source 10c and a second port configured to be coupled to the load 20. A controller module 430 is configured to implement a redundancy state machine 432 that operates the static switches 410a, 410b and the DC/AC converter module 420 to provide power redundancy for the load 40 according to a priority established among the sources 10a, 10b, 10c. The controller module 430 also implements a source designator 434 that varies the designation of the sources 10a, 10b, 10c in the state machine used by the redundancy state machine 432. The modules 410a, 410b, 420 and 430, which may be physically proximate or distributed over a large space, may communicate with one another using communications links, such as Ethernet or CAN links. In some embodiments, all or some of the functions of the controller module 430 may be distributed among the other modules 410a, 410b, 420.

Figure 5:
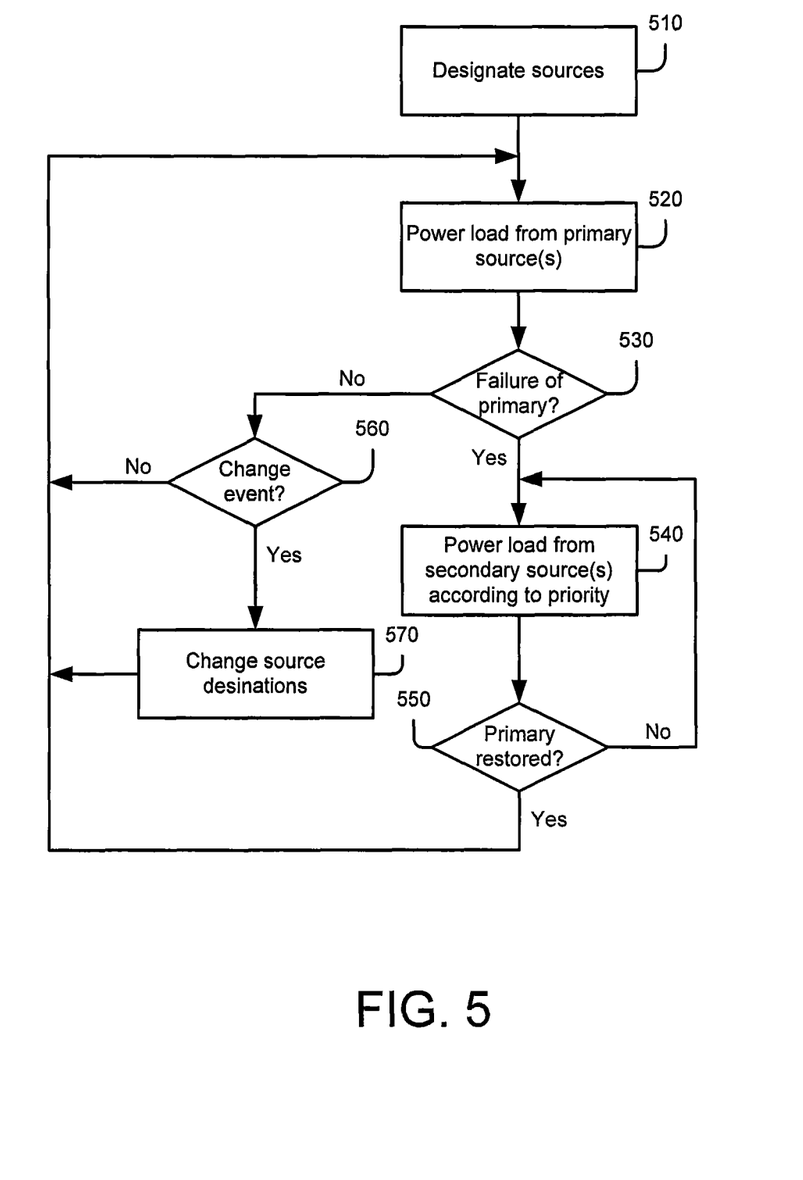
FIG. 5 is a flowchart illustrating operations of a data center power system according to some embodiments.

FIG. 5 is a flowchart illustrating operations that may be performed by systems such as those illustrated in FIGS. 2 and 4. Power source entities for a redundancy state machine are identified (block 510) and a load is powered from the designated "primary" source(s) (block 520). In response to a failure of the designated primary source(s), the load is powered from a designated secondary source(s) (blocks 530, 540). If the primary source(s) is restored, the load is again powered by the primary source(s) (blocks 550, 520). If an event necessitating a change of the source designations is detected, the source designations may be changed (blocks 560, 570). Operations may then be resumed using the new source designations.

Figure 6:
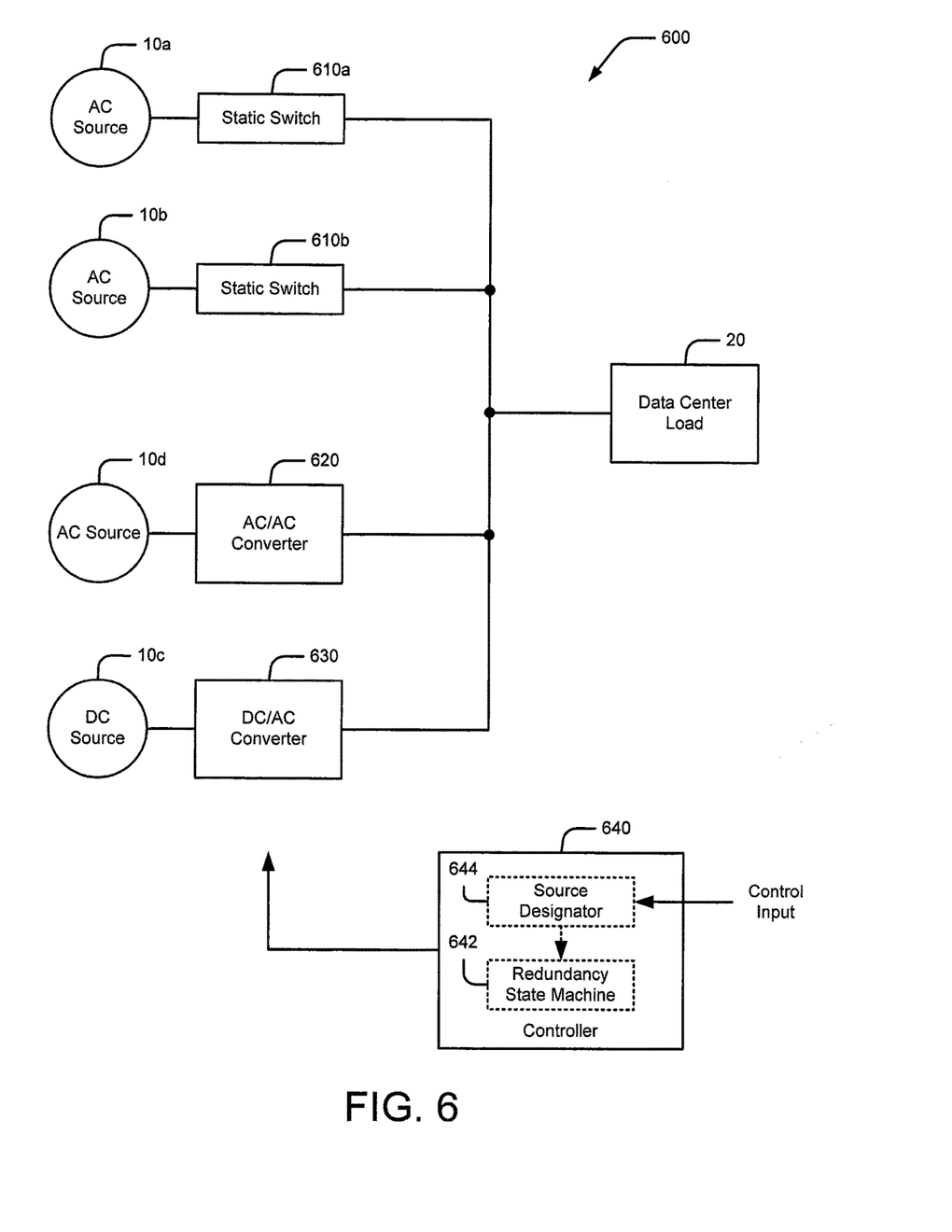
FIG. 6 is a schematic diagram illustrating a data center power system according to further embodiments.

According to further embodiments, types of linkages of sources other than the switches and converters shown in FIGS. 2 and 4 may be used. For example, referring to FIG. 6, a system 600 may include first and second static switches 610a, 610a configured to couple respective AC sources 10a, 10b to a load 20. The system 600 may also include a DC/AC converter 630 that couples the load to a DC source 10c. The system 600 may further include an AC/AC converter 620 configured to couple a third AC source 10d to the load 20. The AC/AC converter 620 may include, for example, a double conversion chain including a cascade combination of a rectifier and an inverter, which may be used to implement power quality conditioning and/or frequency conversion. In some embodiments, the AC/AC converter 630 may include other circuitry that can perform such functions, such as a cycloconverter. A controller 640 is configured to control the switches 610a, 610b and the converters 620, 630, implementing a redundancy state machine 742 that uses dynamic source designations provided by a source designator 644.

Figure 7:
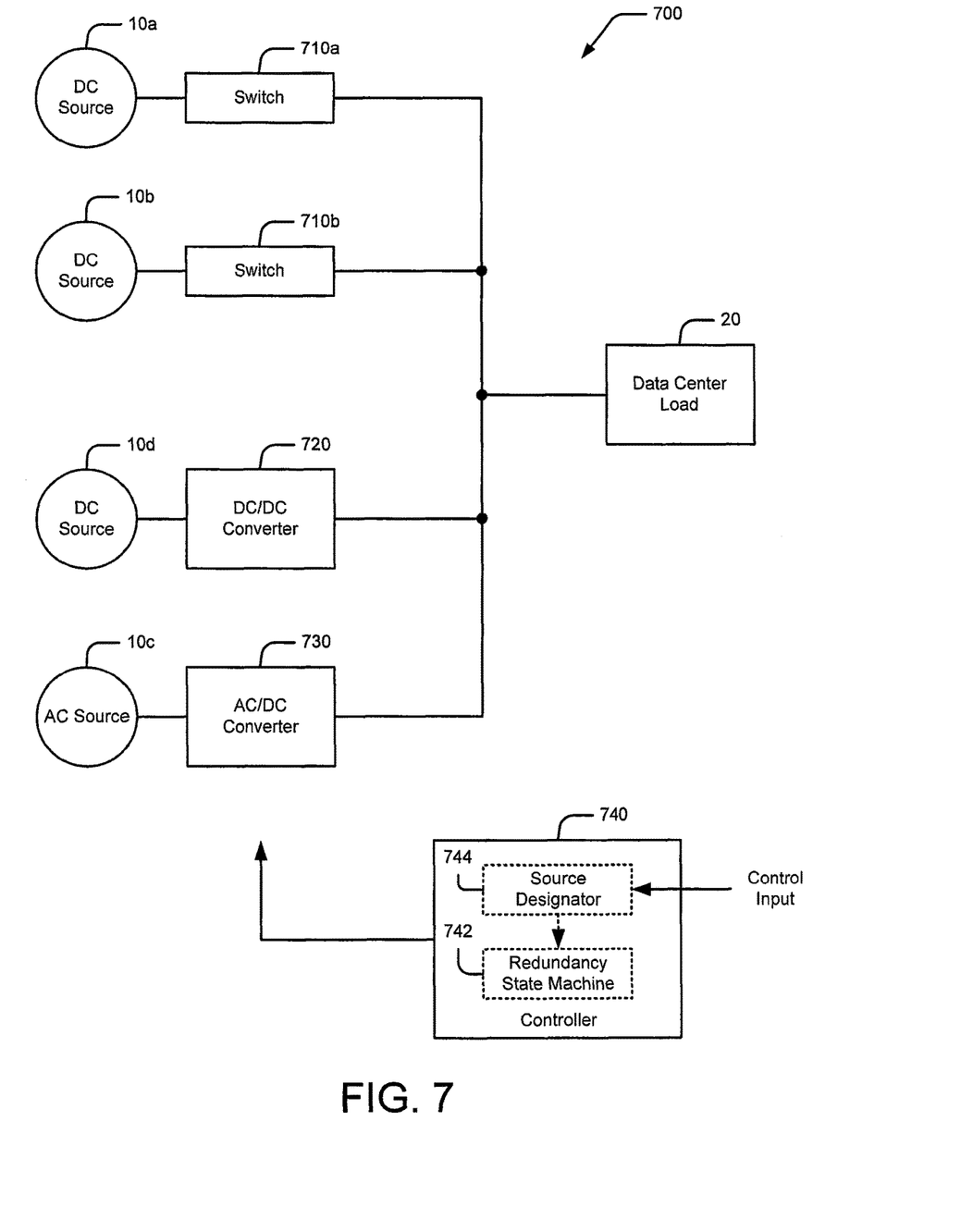
FIG. 7 is schematic diagram illustrating a data center power system DC distribution according to further embodiments.

According to still further embodiments, similar techniques may be used in DC power distribution systems. For example, referring to FIG. 7, a system 700 may include first and second switches 710a, 710a configured to couple respective DC sources 10a, 10b to a load 20. The system 700 may also include an AC/DC converter 730 that couples the load to an AC source 10c, such as a utility source. The system 700 may further include a DC/DC converter 720 configured to couple a third DC source 10d to the load 20. A controller 740 is configured to control the switches 710a, 710b and the converters 720, 730, implementing a redundancy state machine 742 that uses dynamic source designations provided by a source designator 744.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A data center power distribution system comprising:
at least one switch configured to couple at least one first power source to a load;
at least one Converter configured to couple at least one second power source to the load; and a control circuit configured to implement a state machine that controls the at least one switch and the at least one converter to redundantly provide power to the load, wherein the control circuit is configured to vary priority designations used in the state machine for the at least one first power source and the at least one second power source responsive to a control input to vary a priority applied by the state machine to the at least one first power source and the at least one second power source, wherein the priority designations identify one of the at least one first power source and the at least one second power source as a primary power source when the one of the at least one first power source and the at least one second power source satisfies at least two primary power source criteria, and the priority designations identify another one of the at least one first power source and the at least one second power source as a secondary power source for replacing the primary power source when the another one of the at least one first power source and the at least one second power source satisfies only one of the at least two primary power source criteria.

2. The system of claim 1, wherein the secondary power source comprises a plurality of secondary sources and wherein the control circuit is configured to vary priorities among the plurality of secondary sources responsive to the control input.

3. The system of claim 1, wherein the control input comprises a cost and/or a schedule.

4. The system of claim 1, wherein the at least one converter comprises a cascade combination of a Direct Current (DC)/DC converter and an inverter.

5. The system of claim 1, wherein the at least one switch and the at least one converter comprise first and second switches and one converter integrated in a single assembly with the control circuit.

6. The system of claim 1, wherein the at least one first power source comprises at least one Alternating Current (AC) source and wherein the at least one second power source comprises at least one Direct Current (DC) source.

7. The system of claim 1, wherein the at least one first power source comprises at least one Direct Current (DC) source and wherein the at least one second power source comprises at least one Alternating Current (AC) source.

8. An uninterruptible power supply (UPS) comprising:
first and second static switches configured to couple respective first and second Alternating Current (AC) power sources to a load;
a Direct Current (DC)/DC converter having a first port configured to be coupled to a DC power source;
an inverter having a first port coupled to a second port of the DC/DC converter and a second port; configured to be coupled to a load, the first and second static-switches, the DC/DC converter and the inverter integrated in a single assembly; and
a control circuit configured to implement a state machine that controls the first and second static switches, the DC/DC converter and the inverter to redundantly provide power to the load, wherein the control circuit is configured to vary priority designations used by the state machine for the first and second AC power sources and the DC power source responsive to a control input to vary a priority applied by the state machine for the first and second AC power sources and the DC power source, wherein the priority designations identify at least one of the first AC power source, the second AC power source, and the DC power source as a primary power source when the at least one of the first AC power source, the second AC power source, and the DC power source satisfies at least two primary power source criteria, and the priority designations identify at least another one of the first AC power source, the second AC power source, and the DC power source as a secondary power source for replacing the primary power source when the at least another one of the first AC power source, the second AC power source, and the DC power source satisfies only one of at least two primary power source criteria.

9. The UPS of claim 8, wherein the control input comprises a cost and/or a schedule.

10. A method comprising:
providing a data center power distribution system comprising at least one switch configured to couple at least one first power source to a load and at least one converter configured to couple at least one second power source to the load;
operating a state machine that controls the at least one switch and the at least one converter to redundantly provide powder to the load using priority designations for the at least one first power source and the at least one second power source; and
varying the priority designations used by the state machine for the at least one first power source and the at least one second power source responsive to a control input to vary a priority applied by the state machine tor the at least one first power source and the at least one second power source responsive to the control input, wherein the priority designations identify one of the at least one first power source and the at least one second power source as a primary power source when the one of the at least one first power source and the at least one second power source satisfies at least two primary power source criteria, and the priority designations identify another one of the at least one first power source and the at least one second power source as a secondary power source for replacing the primary power source when the another one of the at least one first power source and the at least one second power source satisfies only one of the at least two primary power source criteria.

11. The method of claim 10, wherein the control input comprises a cost and /or a schedule.

12. The method of claim 10, wherein the at least one first power source comprises at least one Alternating Current (AC) source and wherein the at least one second power source comprises at least one Direct Current (DC) source.

13. The method of claim 10, wherein the at least one first power source comprises at least one Direct Current (DC) source and wherein the at least one second power source comprises at least one Alternating Current (AC) source.

* * * * *

UNITED STATES PATENT AND TRADEMARK OFFICE
CERTIFICATE OF CORRECTION

PATENT NO. : 10,468,909 B2
APPLICATION NO. : 14/968944
DATED : November 5, 2019
INVENTOR(S) : George Arthur Navarro and Vincent Edward Wilder It is certified that error appears in the above-identified patent and that said Letters Patent is hereby corrected as shown below:

In the Claims

At Column 6, Line 50, please change "Converter" to -- converter --.
At Column 6, Line 51, please begin a new paragraph at "a control circuit.".
At Column 8, Line 19, please change "powder" to -- power --.
At Column 8, Line 28, please change "tor" to -- for --.
At Column 8, Line 44, please change "and/ or" to -- and/or --.

Signed and Sealed this
Tenth Day of December, 2019

Andrei Iancu
*Director of the United States Patent and Trademark Office*